United States Patent Office 3,451,950
Patented June 24, 1969

3,451,950
METHOD FOR IMPROVING THE ADHESION TO METALS OF THERMOSETTABLE EPOXY RESIN
James A. Clarke and Romeo Lopez, Lake Jackson, Tex., assignors to The Dow Chemical Company, Midland, Mich., a corporation of Delaware
No Drawing. Filed Nov. 26, 1965, Ser. No. 510,051
Int. Cl. C08g 43/00; C09j 3/16; B32b 15/08
U.S. Cl. 260—2  4 Claims

ABSTRACT OF THE DISCLOSURE

This invention relates to a method of improving the adhesion of thermosettable epoxy resins having a plurality of 1,2-epoxide groups per molecule to metals by the addition to 100 parts of epoxy resin, prior to curing thereof, of from about 3 to about 8 parts by weight of a hydroxyalkyl glycidyl ether of the formula:

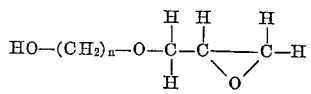

wherein $n$ is an integer from 1 to 6.

---

Exemplary of particularly preferred hydroxyalkyl glycidyl ethers contemplated by the present invention are: hydroxyethyl glycidyl ether, hydroxybutyl glycidyl ether and hdroxypentyl glycidyl ether. Such materials are useful as adhesion promoting agents for metals for use with the common epoxy resins such as the polyglycidyl derivatives of (1) dihydric phenols; (2) alkyl substituted dihydric phenols; (3) halogen substituted dihydric phenols; (4) bisphenols represented by the formula

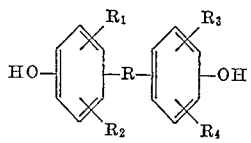

where R is selected from the group consisting of alkylene, —S—, —S—S—,

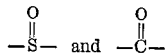

and wherein $R_1$, $R_2$, $R_3$, and $R_4$ are independently selected from the group consisting of hydrogen and halogen; (5) polyoxyalkylene glycols; and (6) the condensation products of formaldehyde and phenol, alkyl substituted phenols or halogen substituted phenols.

Methods of preparing the compositions of the present invention and illustration of desirable and unexpected utility thereof, as adherent coatings for metals, are illustrated in the following examples.

Example 1

100 parts by weight of an epoxy resin comprising essentially a diglycidyl ether of 2,2,-bis (4-hydroxyphenyl) propane having an epoxide equivalent weihgt of 186–192 and a viscosity of 11,000 to 14,000 cps. at 77° F. was placed in a reactor and agitated while maintaining the temperature of the reactor at about 60° C. To the reactor was then added about 2.5 parts per hundred parts of epoxy resin (designated herein as phr.) of a mixture of acrylic latexes dispersed in acetone. The resulting mixtures was then heated to 100° C. and the vapor space purged with nitrogen to remove volatiles. Further heating of the mixture to 130° C. under vacuum accomplished removal of residual solvent. Thereafter, 86 parts of atomized aluminum powder and 6 parts of silica aerogel were added and the mixture cooled to 100° C. under a reduced pressure of about 1 mm. Hg. Thereafter, 7.4 parts of dicyandiamide and 2 parts of melamine were added and the mixture allowed to cool to room temperature while being agitated under atmospheric pressure. This sample is hereinafter referred to as comparative Sample No. 1.

In another experiment, 5 parts of an epoxidized phenol-formaldehyde resin available commercially as DEN 438 (conventionally used to impart high temperature strength to epoxy resin formulations) was added to a formulation having the composition of Sample No. 1 above. This sample is hereinafter referred to as comparative Sample No. 2.

In another experiment, 7.4 parts of butanediol diepoxide (a material conventionally employed in epoxy resin adhesive formulations) was added to a formulation having the composition of Sample No. 1 above. This sample is hereinafter referred to as comparative Sample No. 3.

By way of further direct comparison with Samples 1–3 above, samples were prepared by the addition of hydroxyethyl glycidyl ether to the formulation of Sample No. 1, wherein the amounts of glycidyl ether employed were varied. These samples are hereinafter referred to as Samples No. 4 and No. 5.

Samples No. 6 and No. 7 show the use of other hydroxyalkyl glycidyl ethers which were added to the basic formulation of Sample No. 1 in amounts as prescribed by the present invention.

Thereafter, in each of a series of experiments, two strips of 20 gauge steel, 12 inches in length and 1 inch wide, were sandblasted at one end, spread with one of the adhesive formulations described herein and joined by forming a ½-inch overlap joint. The resulting bond strength of each of the individual samples was determined utilizing a commercial tensile test apparatus and observing the tensile shear required to produce a failure in the bond.

The following Table I identifies the samples used and the tensile shear strength observed.

TABLE I

| Sample No. | Modifying Agent | Amt. (phr.) | Tensile Shear Strength, p.s.i.[1] |
|---|---|---|---|
| For Comparison: | | | |
| 1 | None | | 4,800 |
| 2 | Epoxidized Phenol-formaldehyde resin (DEN 438). | 5 | 4,965 |
| 3 | Butanediol diepoxide | 7.4 | 4,875 |
| This Invention: | | | |
| 4 | Hydroxyethyl glycidyl ether | 5 | 5,440 |
| 5 | do | 7.4 | 5,370 |
| 6 | Hydroxybutyl glycidyl ether | 6.2 | 6,480 |
| 7 | Hydroxypentyl glycidyl ether. | 6.8 | 6,540 |

[1] Average 4 trials.

EXAMPLE 2

In each of a series of experiments formulations heretofore identified as Sample No. 4 and No. 7 of Example No. 1, were separately applied to an untreated surface of individual 4″ x 8″ x 0.024″ aluminum panels and the stress is p.s.i. measured to peel the formulation from the panel. By way of comparison, a sample of an experimental adhesive for metals was used which was an epoxidized phenolformaldehyde resin containing about 15 phr. butanediol diepoxide. This is identified as comparative Sample No. 8. The following Table II shows the comparative peel strengths observed.

TABLE II

| Sample No. | Adhesive Identification | Peel Strength, pounds/inch |
|---|---|---|
| For Comparison: 8 | Epoxidized phenol-formaldehyde resin plus 15 phr. butanediol diepoxide. | 1.5 |
| This Invention: 9 | Sample No. 4 (epoxy resin plus 5 phr. of hydroxyethyl glycidyl ether). | 3.6 |
| 10 | Sample No. 7 (epoxy resin plus 6.8 phr. of hydroxypentyl glycidyl ether). | 9.3 |

The data presented in Examples 1 and 2 illustrate the unexpected usefulness of the hydroxyalkyl glycidyl ethers of this invention for enhancing the adhesion to metal of the described epoxy resins. It is to be understood that such glycidyl ethers may be employed successfully in an amount herein prescribed with any epoxy resin system, as herebefore referred to, wherein any usual additive is employed including epoxy curing agents such as the polyamines, dicarboxylic acid anhydrides and the catalytic curing agents such as $BF_3$, monoethylamine, dicyandiamide, and the like.

What is claimed is:
1. A method of enhancing the adhesion of thermosettable epoxy resins to metals wherein said epoxy resins are selected from the group consisting of the polyglycidyl derivatives of dihydric phenols, alkyl substituted dihydric phenols, halogen subsituted dihydric phenols; bisphenols represented by the formula

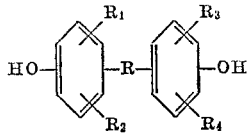

where R is alkylene, —S—, —S—S—, —S—, and

and wherein $R_1$, $R_2$, $R_3$ and $R_4$ are independently selected from hydrogen and halogen; polyoxyalkylene glycols; and the condensation products of formaldehyde and phenol, alkyl substituted phenols and halogen substituted phenols consisting essentially of adding to 100 parts of said epoxy resins, prior to curing said resins to a thermoset condition, of from about 3 to about 8 parts by weight of a hydroxyalkyl glycidyl ether of the formula:

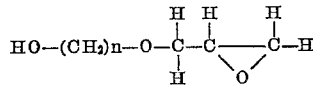

wherein $n$ is an integer from 1 to 6.

2. The method of claim 1 wherein said hydroxyalkyl glycidyl ether is hydroxyethyl glycidyl ether.
3. The method of claim 1 wherein said hydroxyalkyl glycidyl ether is hydroxybutyl glycidyl ether.
4. The method of claim 1 wherein said hydroxyalkyl glycidyl ether is hydroxypentyl glycidyl ether.

References Cited
UNITED STATES PATENTS 3,239,580  3/1966  Pendleton _____ 260—830

FOREIGN PATENTS 794,632  5/1958  Great Britain.

OTHER REFERENCES

Chemical Abstracts 53: 5285c (1959), Citation for British 794,632, not available at this time.

SAMUEL H. BLECK, *Primary Examiner.*

PAUL LIEBERMAN, *Assistant Examiner.*

U.S. Cl. X.R.

117—132; 161—186; 260—2.1, 30.4, 47, 59, 820, 831, 833, 837